April 2, 1929.
E. A. RYDER
1,707,685
PINION THRUST EQUALIZER FOR REDUCTION GEARS
Original Filed Aug. 20, 1926   2 Sheets-Sheet 1
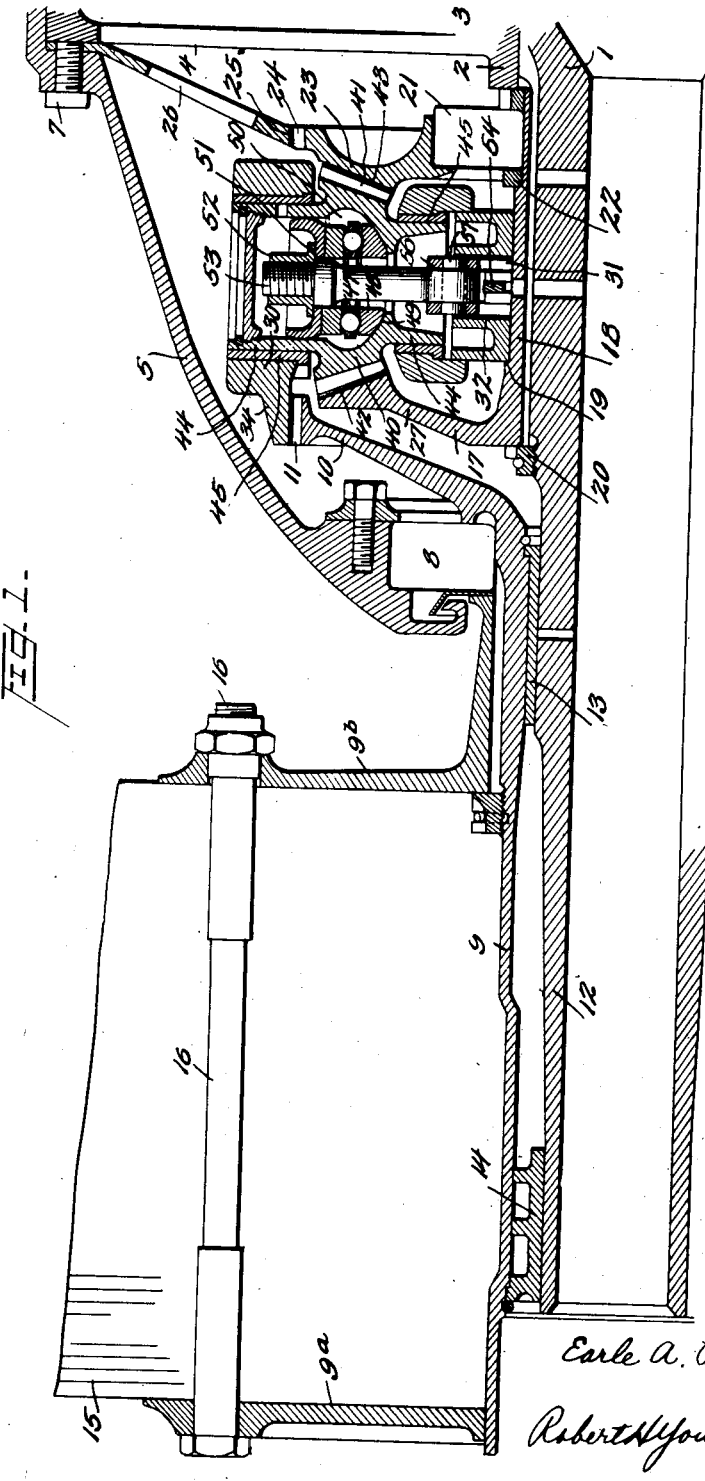
INVENTOR.
Earle A. Ryder
Robert H. Young
ATTORNEY.

April 2, 1929.   E. A. RYDER   1,707,685
PINION THRUST EQUALIZER FOR REDUCTION GEARS
Original Filed Aug. 20, 1926    2 Sheets-Sheet 2
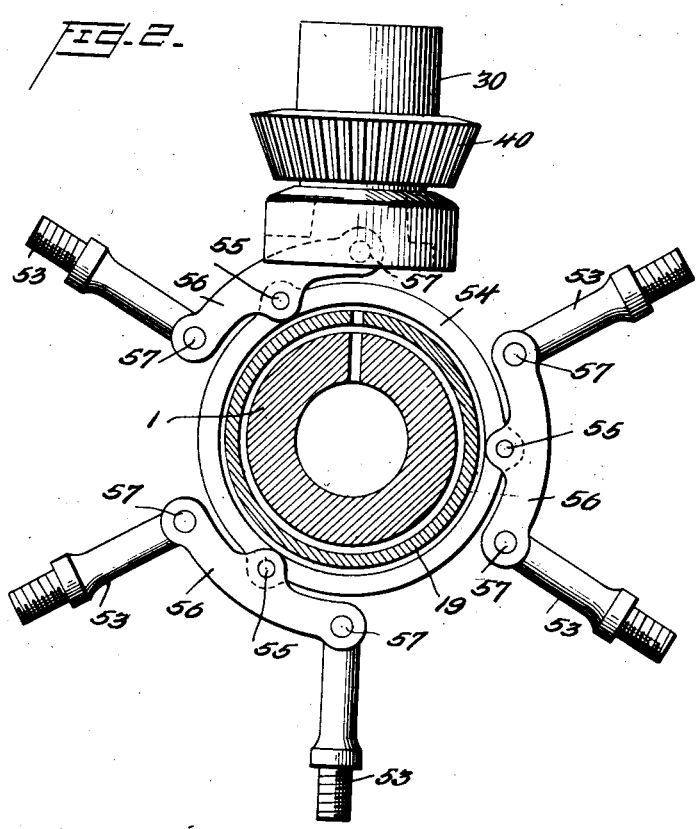
INVENTOR.
BY Earle A. Ryder
Robert H. Young
ATTORNEY.

Patented Apr. 2, 1929.

1,707,685

UNITED STATES PATENT OFFICE.

EARLE A. RYDER, OF WEST HARTFORD, CONNECTICUT, ASSIGNOR TO THE PRATT & WHITNEY AIRCRAFT CO., OF HARTFORD, CONNECTICUT.

PINION THRUST EQUALIZER FOR REDUCTION GEARS.

Original application filed August 20, 1926, Serial No. 130,451. Divided and this application filed January 23, 1928. Serial No. 248,798.

This invention relates in general to improvements in gearing for the transmission of rotary power and more particularly is concerned with planetary gear reduction means for use between the crank shaft of an aeronautical engine and its propeller, and is a division of my application, Serial Number 130,451, pinion thrust equalizer for reduction gears, filed August 20, 1926.
Such gear reduction means for use between the crank shaft of an aeronautical engine and its propeller is, in general, well known in the art but my improvement relates more specifically to a novel means for equalizing the tension of a plurality of planetary pinions on their respective shafts.

In engines of this kind the propeller acts as the fly wheel and it has been found that the gearing between the crank shaft and the engine must be capable of transmitting a torque many times greater than the average torque of the engine.

This condition is due to the impulsive and irregular accelerative torque derived from the explosion of an internal combustion engine which varies widely from the mean torque. The vibration consequently set up in the crankshaft and the gearing connecting the same to the propeller is capable of seriously destructive action, especially when the period of vibration synchronizes with the natural period of torsional vibration of the crank shaft.

In the gear reduction means utilized in my invention I propose to employ planetary bevel gears having a driving gear, a fixed sun gear, and the planet pinion carrier or cage as the driven member. In my drawings I have disclosed six pinion gears. The maximum added strength due to using a multiplicity of pinions is achieved only when each of the pinions bears its full share of the load. With rigid mountings for all the gears and pinions, the limitations of practical construction render it difficult if not impossible to manufacture the parts so accurately that this shall occur. Additionally, the vibrations incidental to operation of the engine tend to cause such deflections as to throw a large proportion of the load on one or a few of the pinions, at least momentarily.

This invention includes means to insure the even distribution of the tooth load over the several pinions in defeat of the distortion of the parts and despite possible inaccuracies in fabrication and assembly.

It is well understood that light weight, which is paramount in aircraft construction, can best be attained by causing every part of a device to work at the maximum permissible stress for the material of which it is fabricated.

The vibration previously discussed may be of such magnitude that a considerable deflection of the end of the crank shaft is likely to ensue with the result that this portion of the shaft will not always remain perpendicular to the plane of the fixed or sun gear. Similar deflections are often caused by lack of running balance in the propeller. The driving gear is fixed to the shaft and moves with it with the result that the pinions which are between the driving gear and the sun gear will be subjected to uneven loads. It is in an effort to compensate for such misalignment due to the lateral oscillation of the crankshaft that this invention has come into existence.

In the transmission of power by bevel gears, the useful load or force occurs in a direction tangential to the pitch surface of the gears. Due to the angularity of the contact between the gear teeth, axial forces are also generated, tending to separate the gears, the magnitude of these forces being a function of the pressure angle of the teeth. For a given pinion functioning in combination with its mating gear, the axial load (also called thrust load or thrust pressure) constantly bears a certain proportion to the tangential or useful force transmitted. It follows from this that if a plurality of pinions meshing with a common gear carry equal tangential loads, they will generate equal thrust pressures.

In a bevel planetary gear of the type contemplated in my invention the several planet pinions are so constrained by the pinion carrier that their respective axes are held in a certain fixed relation to each other, this relation being such that all the pinions can mesh properly with the gears on either side. For example, with six pinions, and the number of teeth on the two gears even multiples of six, the pinion axes may be equally spaced about the centerline of the two gears. If the various parts are placed in relation to each other as above described, and the pinions are additionally constrained axially so as to bear equal loads, a slight axial movement of any one pinion away from the center of the system will reduce the tooth pressure of this pinion, owing to the tapered form of the teeth, and will coincidentally reduce the thrust pressure of this pinion. Conversely, if the axial constraining force on a pinion be reduced in amount that pinion will move outward until the tangential load it carries is reduced in like proportion. It is therefore obvious that any means which will equalize the thrust pressures of the several pinions will also equalize the tangential loads carried by them, and it is to this end that my invention is directed.

In the present disclosure the shafts of the three adjacent pairs of pinions are anchored to the ends of levers which are in turn pivotally connected to a rigid floating ring so that the pinions automatically seek a position in which the tooth loads are balanced.

It is an object of my invention to provide a means for insuring an equal distribution of tooth loads over the several pinions.

It is the prime object of my invention to provide an anchor for the shafts of my pinions such as to insure an equal distribution of the load among the several pinions regardless of the number of pairs of pinions used.

A further object of my invention is to dispense with all means of adjustment of the pinions, with a view to avoiding the bad results of improper setting.

Other objects of my invention will appear in the accompanying specification and claims and will be disclosed in the accompanying drawings in which:

Figure 1 is a central vertical section through my device.

Figure 2 is an end elevation showing my pinion shaft anchoring means.

Referring now with greater particularity to the drawings, it will be seen that my device is comprised as follows:

The engine crank-shaft 1 is journaled in a suitable bearing 2 in the forward end 3 of the crankcase 4. A housing 5 is fixedly secured to the crank case 4 by any suitable means, such as screws 7, and supports an anti-friction bearing 8 for the crank shaft 1. The bearing 8 is provided to support the propeller sleeve 9, the inner end of which is provided with an angularly but substantially radially extending web 10, the said web being constructed with a circumferential toothed portion 11. The extended portion 12 of the crank shaft is rigidly supported by a bushing 13 mounted within the sleeve 9, and the outer end of the sleeve is supported on the crank shaft by means of a bushing 14. On the outer portion of the sleeve and between the flanges $9^a$ and $9^b$ the propeller hub 15 is mounted, suitable propeller bolts 16 being the propeller retaining means.

The driving gear 17 is splined at its hub portion 18 to provide a snug sliding fit with the splines on the shaft so that the gear rotates in unison with the shaft. The gear 17 has a substantially radially extending annulus or driving portion 27. This gear is secured against movement axially of said shaft by a flange 19 on the inner side thereof, and on the outer side by a gland nut 20. On one side of the hub portion 18 of the driving gear 17 there is provided a thrust-bearing 21 of the radial type secured in position by means of a nut 22. A sun gear 23 is mounted on the outer side of the bearing 21. On its outer periphery this gear is provided with means such as a plurality of splines 24 for interlocking engagement with corresponding means or splines 25 on an annular member 26 secured to the crank case 9 by bolts or screws 7. The nature of this sun gear mounting is such that it is capable of a limited motion angularly with respect to the axis of the crank shaft, the splines 24 and 25 and the thrust bearing 21 being adapted to permit such a movement, and a sufficient space being provided between the inner face of the sun gear and the outer surface of the crank case for this purpose. The splines 24 and 25 retain the sun gear against rotative movement about its own axis.

A pinion cage 30 is rotatably mounted on hub 18 between the annulus 27 and the sun gear 23, a slight clearance 31 being left between the inner portion of the cage at 32 and the hub itself. This clearance is provided to permit the cage to float radially about the said hub.

The pinion cage 30 presents portion to receive the inner bushings 45, and an outer portion to receive the outer bushings 45, and is provided with an internal toothed portion 34 which meshes with the toothed portion 11 of the propeller sleeve web 10, the former encircling the latter. The teeth of 34 and 11 have a sliding fit with each other longitudinally of the crank shaft axis to permit of ready assembly, the whole propeller gear assembly being removable by removing screws 7 after the propeller sleeve has been removed. To remove the reduction gear assembly it is necessary only to remove the nut 20.

As before stated, I propose to utilize a plurality of bevel pinions in my reduction gear. In the drawings I have disclosed the use of six such bevel pinions 40 having teeth 41 meshing with the teeth 42 of the annulus 27 and the teeth 43 of the sun gear 23. The gears 40 are largely in the form of a cylindrical shell with their upper and lower ends 44 journaled in bushings 45 in the pinion cage 30, the said gears being positioned with respect to the cage by pivoted shafts 53 and the teeth of the gears projecting through the walls of the cage.

A thrust bearing 47 is provided to take up the thrust of the pinion, one race 48 of the said bearing abutting a shelf 49 in the pinion bore 50 and the other being supported by a flange 51 formed on the nut 52, the nut being screwed on to an adjusting bolt 53 forming the shaft of the pinion, the shaft in turn is secured to a floating anchor member 54 normally concentric with the crank shaft. The structure of this floating anchor member is one of the principal features of my invention.

In devices of this kind, of which I have been aware heretofore, it has been proposed to provide a rigid floating ring for equalizing the thrust on the several pinions, the shafts of the pinions being connected directly to the anchoring means. To this rigid floating ring the inner ends of the pinion shafts were anchored in such a manner as to permit of a limited oscillation angularly with respect to the crank shaft, the anchor ring being capable of a limited floating movement radially about the crank shaft. Such a structure is suitable for equalizing the thrust pressures of two or three pinions but will not serve its purpose in the case of a larger number. Consider the conventional embodiment of this device in which six pinions are to be used. If one pinion is slacked off due to faulty construction or adjustment or to unequal wear of the thrust bearings, this pinion would bear no thrust pressure and carry no load. There is nothing in a rigid floating ring to draw this pinion down into mesh to bear its portion of the load. Further, while a rigid floating ring might serve in a structure to balance the thrust of two oppositely mounted pinions, and while it might serve to effect a partial balance in a system of three pinions it would not serve to balance the thrust of six pinions as it would affect only those pinions opposite or nearly opposite the one on which the increased load has been impressed.

Having reference again to the drawings and especially to Figure 2, it will be seen that my floating anchor ring 54 has pivotally secured thereto on equally spaced pivot studs 55, a plurality of equal armed levers 56. Adjacent the ends of the levers 56 are positioned suitably formed pins 57 to which the inner ends of the pinion shafts are rotatably secured, the pinion shafts being rotatable in a plane perpendicular to the axes of said pins.

From the foregoing it will be seen that any variation of pressure in any one of the shafts will be reflected immediately in and balanced by all the remaining pinions. Any unbalanced pressure on any one pinion shaft will immediately be reflected in the pinion shaft on the other end of the lever on which it is mounted. When the conventional form of such gearing, herein,—before discussed, wherein a rigid floating ring, having three pinions anchored thereto, is used, it has been found that a fair balancing may be obtained when not more than the three pinions were used but that, when six or more pinions were employed, two opposing pinions would tend to balance, taking all of the distorting stresses leaving the remaining four pinions substantially unloaded. With the structure which I have now disclosed it will be seen that my my invention, comprising, as it does, a plurality of pinions mounted on opposing ends of levers positioned equidistantly around a rigid floating ring, provides a means for equalizing pressures about the said ring regardless of the number of pairs of pinions employed.

The self adjusting capabilities of the rigid ring have equal armed levers, pivoted thereto each end of which levers pinion shafts are pivotally mounted, provide automatic compensation for any slight difference in the length of the pinion bolts so that it is unnecessary to incorporate means of adjustment to compensate for inevitable inaccuracies of maufacture of the various parts.

I claim:

1. In combination, in a gear reduction means, a driving bevel gear, a fixed bevel gear, a plurality of shafted pinions therebetween, a rigid floating anchor ring for the shafts of said pinions, flexible means for securing said pinion shafts to said ring, and a driven member.

2. In combination, in a gear reduction means, a driving bevel gear, a fixed bevel gear, a plurality of shafted pinions therebetween, a rigid floating anchor ring for the shafts of said pinions, means for securing in balanced pairs said pinion shafts to said ring, and a driven member.

3. In combination, in a gear reduction means, a driving bevel gear, a fixed bevel gear, and a plurality of shafted pinions therebetween, a rigid floating anchor ring for the shafts of said pinions, equal armed levers pivotally secured to said ring, said shafts being pivotally secured to the ends of said levers, and a driven member.

4. In combination, in a gear reduction means, a driving bevel gear, a fixed bevel gear, a plurality of shafted pinion gears therebetween, said pinion gears being flexibly mounted between said driving gear and said fixed gear, and a driven member.

5. In combination, in a gear reduction means, a driving bevel gear, a fixed bevel gear, a plurality of shafted pinion gears therebetween, a floating rigid ring, said pinion gears being flexibly secured to said rigid floating ring, and a driven member.

6. In combination, in a gear reduction means, a driving bevel gear, a fixed bevel gear, a plurality of shafted pinion gears therebetween, a rigid floating ring, said pinion gears being flexibly mounted in adjacent pairs on said rigid floating ring, and a driven member.

7. In combination, in a gear reduction means, a driving bevel gear, a fixed bevel gear, a plurality of shafted pinion gears therebetween, a rigid floating ring, levers pivoted to said ring, the shafts of said pinions being secured in pairs to the ends of said levers, and a driven member.

In testimony whereof I affix my signature.

EARLE A. RYDER.